United States Patent [19]

Raftis et al.

[11] 4,268,005
[45] May 19, 1981

[54] PINCH VALVE

[75] Inventors: Spiros G. Raftis, Pittsburgh; Lawrence L. Schneider, Carnegie, both of Pa.

[73] Assignee: Red Valve Company, Inc., Carnegie, Pa.

[21] Appl. No.: 967,842

[22] Filed: Dec. 8, 1978

[51] Int. Cl.³ ............................................. F16L 55/14
[52] U.S. Cl. ......................................... 251/5; 285/236
[58] Field of Search ...................................... 251/4–10; 285/109, 236, 397

[56] References Cited

U.S. PATENT DOCUMENTS

| | | | |
|---|---|---|---|
| 2,972,464 | 2/1961 | Jones et al. | 251/5 |
| 3,552,712 | 1/1971 | Whitlock | 251/5 |
| 3,588,034 | 6/1971 | Powell | 251/8 |

Primary Examiner—Alan Cohan
Assistant Examiner—H. Jay Spiegel
Attorney, Agent, or Firm—Kirschstein, Kirschstein, Ottinger & Cobrin

[57] ABSTRACT

An improved pinch valve construction which curtails and prevents end leakage where the valve is joined between two sections of duct or conduit; the valve is especially adapted for usage in large-sized piping such as ducts or conduits having diameters from 8 to 12 feet which carry bulk fluids such as drinking water, raw sewage, etc. The pinch valve configuration has end fittings which are a combination of elements including a clamping ring, which permit the easy fabrication and assembly of the valve components and eliminate the need for costly tooling and castings; standard sized components can be used. The present pinch valve construction is cheaper and better than prior art pinch valves, being less susceptible to leakage, and is readily installed and repaired. Positive control and modulation of fluid flow is attained, and the overlapping ends of the pinch valve members, which straddle the ends of the duct or conduit, assure a strong and fluid-impervious joint.

5 Claims, 7 Drawing Figures

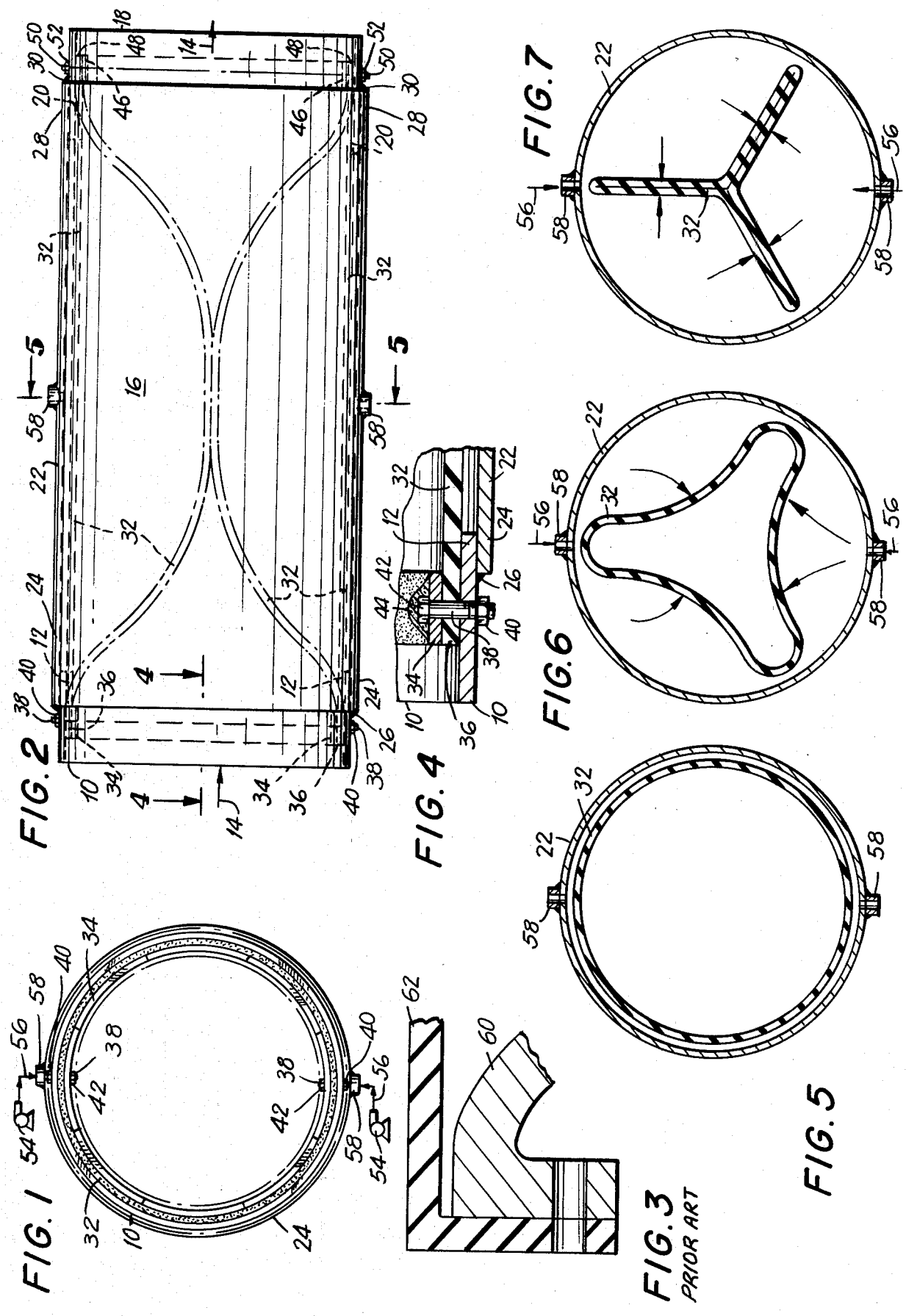

PINCH VALVE

BACKGROUND OF THE INVENTION

1. Field of the Invention

A pinch valve construction for modulating and curtailing the flow of a fluid.

2. Description of the Prior Art

Pinch valves basically consist of a flexible resilient cylindrical elastomeric sleeve or the like which is interposed in a continuous conduit, duct, pipe, or tube, together with means to constrict the sleeve so as to curtail or control the flow of fluid through the conduit or the like. In most instances, the sleeve is concentrically oriented within an outer rigid valve housing, and means are provided to impress a fluid under pressure between the sleeve and the housing so that the sleeve is squeezed inwards and deformed or collapsed to provide a smaller fluid flow passage. In other instances, mechanical means are provided to pinch the sleeve to accomplish the same result. One problem encountered with pinch valves of the prior art is a tendency of the joints between the sleeve and/or the valve housing, and the continuous lengths of conduit or the like, to ultimately leak due to distortion of the sleeve and repeated flexing of the same.

Normally, a pinch valve sleeve is made from pure gum rubber, neoprene, BUNA, butyl, hypalon, urethane, viton, EPT (nordel), silicone and food grade rubber.

Pinch valve constructions, as generally described herein, have been used in a wide variety of situations. More specifically, pinch valve constructions as described herein have been used in controlling the flow of, by way of example, solids in suspension (either in slurry or air-conveyed form), especially abrasive materials such as metallic ores, asbestos fibers, sand, coal, sugar, wood chips or pulps, paper stock, plastic pellets, raw sewage, talc, cement, fly ash, and various chemicals and foodstuffs.

Among the prior art relating to pinch valve constructions may be mentioned U.S. Pat. Nos. 4,125,125; 3,838,704; 3,483,892; 3,445,085; 3,441,245; 3,396,448; 3,371,677; 3,272,470 and 3,159,373; U.S. Pat. Application Ser. No. 830,453 filed Sept. 6, 1977 now U.S. Pat. No. 4,172,580; German Pat. No. 1,038,850; British Pat. No. 639,646 and Italian Pat. No. 535,034.

SUMMARY OF THE INVENTION

1. Purposes of the Invention

It is an object of the present invention to provide an improved pinch valve construction.

Another object is to provide a pinch valve construction which is less susceptible than prior art configurations to leakage at the joints between the valve and the conduit or like through which fluid is flowing.

A further object is to provide a pinch valve construction in which the ends of the valve are integral with the ends of the conduit or the like.

An additional object is to eliminate the need of a flanged casting and casting sleeve in large-sized pinch valves.

Still another object is to obviate the necessity for providing a large-sized vulcanizer, and mandrel and form equipment, to fit a large-sized rubber sleeve for a large diameter pinch valve.

Still a further object is to make it possible to utilize a piece of standard pipe for the valve housing, and thus to eliminate patterns for cast iron castings, for large-sized pinch valves.

Still an additional object is to provide a pinch valve construction especially adapted for large diameter pinch valves used in pipes, ducts and conduits, in which the sleeve is made from rubber sheet that can be vulcanized on a strip vulcanizer or flat, thus obviating the mandrel which would otherwise be required.

An object is to provide a pinch valve construction, especially adapted for large-sized pinch valves used in conduits and ducts, which is cheaper and simpler to fabricate and assemble than prior art configurations.

An object is to provide an improved pinch valve construction which is especially adaptable to large-sized pinch valve units used in pipes, conduits and ducts.

An object is to control the large scale flow of a fluid such as sewage through a duct or conduit in an improved manner.

An object is to provide a pinch valve construction especially adapted for use with large-sized ducts and conduits of 8 to 12 feet in diameter.

An object is to provide a new pinch valve construction which provides an easy way to build a large size valve and which saves a great deal of money in manufacturing the valve.

These and other objects and advantages of the present invention will become evident from the description which follows.

2. Brief Description of the Invention

In the present invention, the improved pinch valve construction basically entails the provision of spaced apart fluid inlet and outlet duct sections in coaxial registration, between which is interposed the structural elements of the pinch valve. The new pinch valve thus includes a cylindrical fluid inlet duct section having a fluid inlet end for entry of fluid through the inlet duct section into the pinch valve section, the pinch valve section per se, and a cylindrical outlet duct section which is coaxial with and spaced from the inlet duct section, and which has a fluid outlet end for egress of fluid from the pinch valve section through the outlet duct section. The fluid outlet end of the outlet duct section is spaced from, and opposite to, the fluid inlet end of the inlet duct section.

The pinch valve section includes a cylindrical valve housing which is coaxial with and between the inlet duct section and the outlet duct section, and which extends between the aforementioned fluid inlet end and fluid outlet end. One end of the valve housing is concentrically mounted to the outer surface of the fluid inlet end with a fluid-impervious mounting, and the other end of the valve housing is concentrically mounted to the outer surface of the fluid outlet end with a fluid-impervious mounting. The pinch valve section also includes a flexible resilient cylindrical sleeve which is concentrically disposed within and spaced from the valve housing. Fluid-impervious means are provided to secure one end of the sleeve to the inner surface of the fluid inlet end. This securing means includes a first clamping ring within the sleeve, which first ring is concentric and coaxial with both the one end of the sleeve and the fluid inlet end. Also, the first ring is contiguous with the one end of the sleeve, and means are provided to clamp the first clamping ring to this one end of the sleeve. Fluid-impervious means are also provided to secure the other end of the sleeve to the inner surface of the fluid outlet end. This securing means includes a second clamping ring within the sleeve, which second ring is concentric and coaxial with both the other end of the sleeve and the fluid outlet end. Also, the second ring is contiguous with the other end of the sleeve, and means are provided to clamp the second clamping ring to the other end of the sleeve.

Finally, means are provided to impress a fluid between the sleeve and the valve housing, so that the sleeve is inwardly deformable to pinch and curtail the flow of fluid through the sleeve.

Typically, a high volumetric flow rate of fluid through the inlet duct section, the sleeve, and the outlet duct section is encountered. Such high flow rates typically are prevalent in the handling of sewage, water flow through aqueducts from reservoirs to metropolitan areas, conduits or passageways associated with dams such as hydroelectric or flood control dams, pollution control facilities for large scale thermal power plants in which sulfur-containing coal or oil is burned and sulfur dioxide must be removed from the resultant stack gas to prevent air pollution, wind tunnels for aeronautical testing, etc., ventilation systems for vehicular tunnels, etc. In many of these instances, large conduits and ducts are specified and installed which have diameters of 8 to 12 feet or more.

Any suitable fluid may be impressed between the sleeve and the valve housing. Air is preferred; however, water, a silicone oil, a hydrocarbon oil, or the like may be employed as the modulating agent for the adjustment of the dimension of the sleeve. Generally, the means to clamp the first clamping ring to the one end of the sleeve, and the means to clamp the second clamping ring to the other end of the sleeve, are both the same and consist in each instance of a plurality of threaded bolts, each of the bolts having a terminal nut external to and contiguous with either the fluid inlet end of the inlet duct section, or the fluid outlet end of the outlet duct section. These bolts are typically radially arrayed relative to the central longitudinal axis of the sleeve.

The pinch valve construction of the present invention provides several salient advantages. Positive control and modulation of fluid flow is accomplished and attained in a less expensive installation having structural members and components of standard configuration. The overlapping ends of the pinch valve members, which straddle the ends of the duct or conduit, assure a strong and fluid-impervious joint. The present pinch valve construction is cheaper and better than prior art pinch valves, especially for large-sized installations where conduits or ducts from 8 to 12 feet in diameter or larger are encountered. The present device is less susceptible to leakage, and is readily installed and repaired. The valve is especially adapted for usage in large-sized piping such as ducts or conduits which carry bulk fluids such as drinking water, raw sewage, etc. The present configuration permits the easy fabrication and assembly of the valve components, and eliminates the need for costly tooling and castings; standard sized components can be used in most instances.

Other advantages of the present improved pinch valve construction include the feature that the valve is less susceptible than prior art configurations to leakage at the joints between the valve and the conduit or the like through which fluid is flowing. The ends of the valve are integral with the ends of the conduit or the like, which assures a strong, positive joint capable of accommodating stresses due to changes in flow rate, surges of fluid, temperature or pressure changes, etc., without bursting or leaking. The need of a flanged casting and casting sleeve in large-sized pinch valves is eliminated. The prior art necessity for providing a large-sized vulcanizer, and mandrel and form equipment, to fit a large-sized rubber sleeve for a large diameter pinch valve, has now been obviated. In the present pinch valve, it is possible to utilize a piece of standard pipe for the valve housing, and thus to eliminate patterns for cast-iron castings, for large-sized pinch valves. The present pinch valve construction is especially adapted for large diameter pinch valves used in pipes, ducts, and conduits, in which the sleeve is made from rubber sheet that can be vulcanized on a strip vulcanizer or flat, thus obviating the mandrel which would otherwise be required. The present pinch valve is cheaper and simpler to fabricate, assemble and install than prior art configurations. In summary, the present pinch valve construction provides an easy way to build a large size valve, and saves a great deal of money in manufacturing the valve.

The invention accordingly consists in the features of construction, combination of elements and arrangement of parts, which will be exemplified in the pinch valve device hereinafter described and of which the scope of application will be indicated in the appended claims.

BRIEF DESCRIPTION OF THE DRAWINGS

In the accompanying drawings in which is shown one of the various possible embodiments of the invention:

FIG. 1 is a cross-sectional elevation view of the end joint of the present pinch valve;

FIG. 2 is a longitudinal elevation view of the pinch valve and associated duct sections;

FIG. 3 shows a prior art joint configuration;

FIG. 4 is a detail plan view of a portion of the joint of the present pinch valve, taken substantially along the line 4—4 of FIG. 2;

FIG. 5 is a sectional elevation view taken substantially along the line 5—5 of FIG. 2, and showing a fully distended and open sleeve allowing for maximum fluid flow;

FIG. 6 is similar to FIG. 5 but with the sleeve partially collapsed; and

FIG. 7 shows the sleeve in fully collapsed configuration with maximum constriction and curtailing of fluid flow.

DETAILED DESCRIPTION OF THE PREFERRED EMBODIMENTS

Referring now to the FIGS. 1, 2 and 4, the present pinch valve includes a cylindrical fluid inlet duct section 10 having a fluid inlet end 12 for entry of a fluid stream 14, e.g. sewage, through the inlet duct section 10 into the pinch valve, generally designated as 16. The pinch valve also includes a cylindrical fluid outlet duct section 18 which is coaxial with and spaced from the inlet duct section 10; the pinch valve 16 being interposed between the members 10 and 18. The outlet duct section 18 has a fluid outlet end 20 for egress of fluid stream 14 from the pinch valve 16 through the outlet duct section 18. The fluid outlet end 20 of the outlet duct section 18 is spaced from and opposite to the fluid inlet end 12 of the inlet duct section 10.

The pinch valve 16 per se includes a cylindrical valve housing 22 which is coaxial with the inlet duct section 10 and the outlet duct section 18, and which extends between the fluid inlet end 12 and the fluid outlet end 20. One end 24 of the valve housing 22 is concentrically mounted to the outer surface of the fluid inlet end 12 with a fluid-impervious mounting; typically, welding seam 26 or the like is provided external to the joint. The other end 28 of the valve housing 22 is concentrically mounted to the outer surface of the fluid outlet end 20 with a fluid-impervious mounting; typically welding seam 30 or the like is provided external to the joint.

A flexible resilient cylindrical sleeve 32 is concentrically disposed within and spaced from the valve housing 22, i.e. the members 32 and 22 are coaxial, and coaxially oriented along the central longitudinal axis of the duct members 10 and 18, which are also coaxial. Fluid-impervious means including a sectioned first clamping ring 34 within the sleeve 32 are provided to secure one end 36 of the sleeve 32 to the inner surface of the fluid inlet end 12. The first ring 34 is concentric and coaxial with both the one end 36 of the sleeve 32 and the fluid inlet end 12; the first ring 34 is also contiguous with the one end 36 of the sleeve 32, as best seen in FIG. 4.

Means are provided to clamp the first ring 34 to the one end 36 of the sleeve 32. In this embodiment of the invention, this means consists of a first plurality of threaded bolts 38, each of which has a terminal nut 40 external to and contiguous with the fluid inlet end 12 of the inlet duct section 10. The manual tightening of the nuts 40 serves to firmly clamp the clamping ring 34 against the sleeve end 36 so as to attain a fluid-impervious joint. Typically, the bolts 38 are radially arrayed relative to the central longitudinal axis of the sleeve 32 and the other cylindrical members 22, 10 and 18, as best can be seen in FIG. 1. As shown in FIG. 4, the head 42 of each bolt 38 is covered with deposit 44 consisting of welding, a plastic sealant, or the like, to prevent leakage through the bolt hole and about the body or shank of the bolt 38. The bolt heads can be coated for smooth entry.

Similar fluid-impervious means including a second clamping ring 46 (FIG. 2) within the sleeve 32 are provided to secure the other end 48 of the sleeve 32 to the inner surface of the fluid outlet end 20. The second ring 46 is concentric and coaxial with both the other end 48 of the sleeve 32 and the fluid outlet end 20; the second ring 46 is also contiguous with the other end 48 of the sleeve 32.

Means are provided to clamp the second ring 46 to the other end 48 of the sleeve 32. This means is comparable to the means described supra for clamping the first ring 34 to the one end 36 of the sleeve 32, e.g., a second plurality of threaded bolts 50 having terminal nuts 52 external to and contiguous with the fluid outlet end 20 of the outlet duct section 18. The manual tightening of the nuts 52 serves to firmly clamp the clamping ring 46 against the sleeve end 48 so as to attain a fluid-impervious joint. Typically, the bolts 50 are radially arrayed relative to the central longitudinal axis of the sleeve 32 and the other cylindrical members 22, 10 and 18.

Finally, the present pinch valve generally includes means to impress a fluid, e.g. air, between the sleeve 32 and the valve housing 22, so that the sleeve 32 may be inwardly deformed as shown in FIGS. 6 and 7 to partially or totally pinch and curtail the flow of fluid stream 14 through the sleeve 32, as shown in phantom outline (FIG. 2). Thus, referring to FIG. 1, air pumps 54 pump air streams 56 via nozzles 58 into the annular space between members 32 and 22, to partially (FIG. 6) or totally (FIG. 7) collapse the sleeve member 32. The preferred three-way closure as shown is provided for minimum outside diameter and weight. In FIG. 5, the pinch valve is full open with typical air pressure 0 psig; in FIG. 6, the pinch valve is half closed with typical air pressure 10 psig; and in FIG. 7, the pinch valve is 99.5% closed with typical air pressure 30 psig. Suitable controls known to those skilled in the art will be provided in practice to control the flow of streams 56; a bleed valve will also be provided to release portions or all of streams 56 when a greater flow rate of stream 14 is desired, e.g. as in the fully opened cirucular configurations of sleeve 32 for maximum flow rate of stream 14 as shown in FIG. 5.

As mentioned supra, the present pinch valve configuration is especially applicable for flow control in large sized conduits, ducts and the like, e.g. in instances where the inlet duct section 10, the sleeve 32 and the outlet duct section 18 each have a diameter in the range of about eight feet to about twelve feet. The present pinch valve is especially suitable for controlling high volumetric flow rates in such large sized conduits and ducts.

Finally, FIG. 3 shows a prior art joint used by all manufacturers, with flanges for both body 60 and sleeve 62.

It thus will be seen that there is provided a pinch valve device which achieves the various objects of the invention and which is well adapted to meet the conditions of practical use.

As various possible embodiments might be made of the above invention, and as various changes might be made in the embodiment above set forth, it is to be understood that all matter herein described or shown in the accompanying drawings is to be interpreted as illustrative and not in a limiting sense. Thus, it will be understood by those skilled in the art that although preferred and alternative embodiments have been shown and described in accordance with the Patent Statutes, the invention is not limited thereto or thereby.

Having thus described the invention, there is claimed as new and desired to be secured by Letters Patent:

1. A pinch valve construction comprising a cylindrical fluid inlet duct section, said inlet duct section having a fluid inlet end for entry of fluid through the inlet duct section into the pinch valve, a cylindrical outlet duct section, said outlet duct section being coaxial with and spaced from said inlet duct section, said outlet duct section having a fluid outlet end for egress of fluid from the pinch valve through the outlet duct section, said fluid outlet end of said outlet duct section being spaced from and opposite to said fluid inlet end of said inlet duct section, a cylindrical valve housing, said valve housing being coaxial with said inlet duct section and said outlet duct section, and extending between said fluid inlet end and said fluid outlet end, one end of said valve housing being concentrically mounted to the outer surface of said fluid inlet end with a fluid-impervious mounting, the other end of said valve housing being concentrically mounted to the outer surface of said fluid outlet end with a fluid-impervious mounting, a flexible resilient cylindrical sleeve, said sleeve being concentrically disposed within and spaced from said valve housing, fluid-impervious means to secure one end of said sleeve to the inner surface of said fluid inlet end, said one end of said sleeve and said one end of said valve housing straddling said fluid inlet end of said inlet duct section, said means to secure the one end of said sleeve including a first clamping ring within said sleeve, said first ring being concentric and coaxial with both the one end of said sleeve and said fluid inlet end, said first ring being contiguous with the one end of said sleeve, means comprising a first plurality of threaded bolts to clamp said first clamping ring to the one end of said sleeve, each of said first plurality of bolts having a terminal nut external to and contiguous with the fluid inlet end of the inlet duct section, fluid-impervious means to secure the other end of said sleeve to the inner surface of said fluid outlet end, said other end of said sleeve and said other end of said valve housing straddling said fluid outlet end of said outlet duct section, said means to secure the other end of said sleeve including a second clamping ring within said sleeve, said second ring being concentric and coaxial with both the other end of said sleeve and said fluid outlet end, said second ring being contiguous with the other end of said sleeve, means comprising a second plurality of threaded bolts to clamp said second clamping ring to the other end of said sleeve, each of said second plurality of bolts having a terminal nut external to and contiguous with the fluid outlet end of the outlet duct section, and means to impress a fluid between said sleeve and said valve housing so that said sleeve is inwardly deformable to pinch and curtail the flow of fluid through said sleeve.

2. The pinch valve construction of claim 1 in which the fluid flowing through the sleeve, and concomitantly through the inlet duct section and the outlet duct section, is sewage.

3. The pinch valve construction of claim 1 in which the fluid impressed between the sleeve and the valve housing is air.

4. The pinch valve construction of claim 1 in which the bolts are radially arrayed relative to the central longitudinal axis of the sleeve.

5. The pinch valve construction of claim 1 in which the inlet duct section, the sleeve and the outlet duct section each have a diameter in the range of about 8 feet to about 12 feet.

* * * * *